United States Patent
Apte et al.

(10) Patent No.: US 9,762,437 B2
(45) Date of Patent: Sep. 12, 2017

(54) SYSTEMS AND METHODS FOR NETWORKING CONSUMER DEVICES

(71) Applicant: The Procter & Gamble Company, Cincinnati, OH (US)

(72) Inventors: Raj B. Apte, Palo Alto, CA (US); Christopher Paulson, Livermore, CA (US); Erik John Hasenoehrl, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 29 days.

(21) Appl. No.: 13/943,816

(22) Filed: Jul. 17, 2013

(65) Prior Publication Data

US 2014/0022939 A1 Jan. 23, 2014

Related U.S. Application Data

(63) Continuation-in-part of application No. 13/551,539, filed on Jul. 17, 2012.

(51) Int. Cl.
*H04B 7/00* (2006.01)
*H04L 12/24* (2006.01)
*H04L 12/28* (2006.01)
*H04W 40/24* (2009.01)

(52) U.S. Cl.
CPC ...... *H04L 41/0806* (2013.01); *H04L 12/2827* (2013.01); *H04W 40/246* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 2,362,714 | A | 11/1944 | Nettel |
| 5,276,630 | A | 1/1994 | Baldwin et al. |
| 5,296,702 | A | 3/1994 | Beck |
| 5,410,410 | A | 4/1995 | Yamazaki |
| 5,899,367 | A | 5/1999 | Strength et al. |
| 6,574,482 | B1 | 6/2003 | Radomsky |
| 7,184,407 | B1 | 2/2007 | Myles et al. |
| 7,222,153 | B2 | 5/2007 | Ando et al. |
| 7,324,824 | B2 | 1/2008 | Smith et al. |

(Continued)

FOREIGN PATENT DOCUMENTS

| | | |
|---|---|---|
| CN | 102496255 A | 6/2012 |
| EP | 1432151 A1 | 6/2004 |

(Continued)

OTHER PUBLICATIONS

International Search Report; International Application No. PCT/US2013/050822; date of mailing Dec. 17, 2013; 21 pages.

(Continued)

*Primary Examiner* — Minh-Trang Nguyen
(74) *Attorney, Agent, or Firm* — David K Mattheis; John Todd Dipre (57) ABSTRACT

Systems and methods for enrolling nodes into an ad hoc network associated with a multi-roomed structure. Nodes within the ad hoc network comprise a communication module configured to communicate with the ad hoc network using at least one of room-limited communications and room-transparent communications.

28 Claims, 7 Drawing Sheets

(56) References Cited

U.S. PATENT DOCUMENTS

| | | |
|---|---|---|
| 7,772,986 B2 | 8/2010 | Olson et al. |
| 8,063,750 B2 | 11/2011 | Knibbe |
| 8,193,929 B1 | 6/2012 | Siu et al. |
| 8,249,462 B2 | 8/2012 | Budde et al. |
| 8,615,526 B2 | 12/2013 | Sinha et al. |
| 2002/0178292 A1 | 11/2002 | Mushkin et al. |
| 2003/0050737 A1 | 3/2003 | Osann, Jr. |
| 2003/0191558 A1 | 10/2003 | Arellano |
| 2003/0199247 A1 | 10/2003 | Striemer |
| 2004/0225740 A1 | 11/2004 | Klemba et al. |
| 2005/0007249 A1 | 1/2005 | Eryurek et al. |
| 2005/0075954 A1 | 4/2005 | Matsumoto et al. |
| 2005/0094610 A1 | 5/2005 | de Clerq et al. |
| 2005/0169214 A1 | 8/2005 | Suomela |
| 2005/0212663 A1 | 9/2005 | Matsumoto et al. |
| 2006/0010388 A1 | 1/2006 | Imhof et al. |
| 2006/0044152 A1 | 3/2006 | Wang |
| 2006/0059545 A1 | 3/2006 | Stanforth |
| 2006/0250980 A1 | 11/2006 | Pereia et al. |
| 2006/0277059 A1* | 12/2006 | J'maev et al. .......... 705/1 |
| 2006/0289730 A1 | 12/2006 | Niiho |
| 2007/0182571 A1 | 8/2007 | Kennish et al. |
| 2007/0283005 A1 | 12/2007 | Beliles et al. |
| 2008/0069008 A1* | 3/2008 | Park et al. .......... 370/254 |
| 2008/0157957 A1 | 7/2008 | Pitchers |
| 2008/0159494 A1 | 7/2008 | Quinlan et al. |
| 2008/0161672 A1 | 7/2008 | Marar |
| 2008/0186871 A1 | 8/2008 | Trevino et al. |
| 2008/0218334 A1 | 9/2008 | Pitchers et al. |
| 2008/0222431 A1 | 9/2008 | Paniagua et al. |
| 2008/0231111 A1 | 9/2008 | Hazani et al. |
| 2008/0246599 A1 | 10/2008 | Hufton et al. |
| 2008/0265799 A1 | 10/2008 | Sibert |
| 2008/0303707 A1 | 12/2008 | Larsen et al. |
| 2009/0177323 A1 | 7/2009 | Ziegler |
| 2009/0198734 A1 | 8/2009 | Tessier |
| 2009/0215536 A1 | 8/2009 | Yee et al. |
| 2009/0265488 A1 | 10/2009 | Birger |
| 2010/0082485 A1 | 4/2010 | Lin et al. |
| 2010/0143186 A1 | 6/2010 | Belmonte et al. |
| 2010/0202355 A1 | 8/2010 | Kim et al. |
| 2010/0226645 A1 | 9/2010 | Van Der Wateren |
| 2010/0232354 A1 | 9/2010 | Patil et al. |
| 2010/0238935 A1 | 9/2010 | Sendrowicz |
| 2011/0059752 A1 | 3/2011 | Garin et al. |
| 2011/0068922 A1 | 3/2011 | Ross |
| 2011/0084804 A1 | 4/2011 | Khorashad et al. |
| 2011/0105041 A1 | 5/2011 | Maruyama |
| 2011/0251807 A1 | 10/2011 | Rada et al. |
| 2011/0291840 A1 | 12/2011 | Pelland et al. |
| 2011/0299854 A1 | 12/2011 | Jonsson et al. |
| 2012/0031922 A1 | 2/2012 | Johnson |
| 2012/0039310 A1 | 2/2012 | Dahl et al. |
| 2012/0165959 A1 | 6/2012 | Van Der Stok |
| 2012/0221720 A1 | 8/2012 | Trevino et al. |
| 2012/0235579 A1* | 9/2012 | Chemel et al. .......... 315/152 |
| 2013/0083997 A1 | 4/2013 | Matthews |
| 2013/0109406 A1 | 5/2013 | Meador et al. |
| 2013/0218511 A1 | 8/2013 | Mager et al. |
| 2014/0022061 A1 | 1/2014 | Apte et al. |
| 2014/0022793 A1 | 1/2014 | Apte et al. |
| 2014/0022917 A1 | 1/2014 | Apte et al. |
| 2014/0022939 A1 | 1/2014 | Apte et al. |
| 2014/0022940 A1 | 1/2014 | Apte et al. |
| 2014/0022941 A1 | 1/2014 | Apte et al. |
| 2014/0022968 A1 | 1/2014 | Apte et al. |
| 2014/0023060 A1 | 1/2014 | Apte et al. |
| 2014/0023363 A1 | 1/2014 | Apte et al. |
| 2014/0025798 A1 | 1/2014 | Apte et al. |
| 2014/0025805 A1 | 1/2014 | Apte et al. |
| 2015/0081040 A1 | 3/2015 | Apte |

FOREIGN PATENT DOCUMENTS

| | | |
|---|---|---|
| EP | 2 362 714 A1 | 8/2011 |
| EP | 2362714 A1 | 8/2011 |
| EP | 2804446 A1 | 11/2014 |
| JP | H09130381 | 5/1997 |
| JP | 2003078470 | 3/2003 |
| JP | 200613928 | 1/2006 |
| JP | 2006114997 | 4/2006 |
| JP | A-2006-101399 | 4/2006 |
| JP | 2007221194 | 8/2007 |
| JP | A-2007-233619 | 9/2007 |
| JP | 2007282044 | 10/2007 |
| JP | A-2008-109849 | 5/2008 |
| JP | A-2009-009809 | 1/2009 |
| JP | A-2010-197050 | 9/2010 |
| JP | 2010283608 | 12/2010 |
| JP | 201279343 | 1/2012 |
| WO | WO 01/97466 A1 | 12/2001 |
| WO | WO 03/017542 A1 | 2/2003 |
| WO | WO 2005/088339 A1 | 9/2005 |
| WO | WO 2005125155 A1 | 12/2005 |
| WO | WO 2006/095315 A1 | 9/2006 |
| WO | WO 2006/095316 A1 | 9/2006 |
| WO | WO 2007/029205 A2 | 3/2007 |
| WO | WO 2007149025 A1 | 12/2007 |
| WO | WO 2008/119158 A1 | 10/2008 |
| WO | WO 2010/100555 | 1/2010 |
| WO | WO 2011/087498 A1 | 7/2011 |
| WO | WO 2011156914 A2 | 12/2011 |

OTHER PUBLICATIONS

International Search Report; International Application No. PCT/US2013/050824; date of mailing Jan. 10, 2014; 17 pages.

International Search Report; International Application No. PCT/US2013/050834; date of mailing Dec. 3, 2013; 18 pages.

Invitation to Pay Additional Fees; International Application No. PCT/US2013/050835; date of mailing Oct. 24, 2013; 6 pages.

International Search Report; International Application No. PCT/US2013/050820; date of mailing Oct. 14, 2013; 11 pages.

International Search Report; International Application No. PCT/US2013/050821; date of mailing Jan. 8, 2014; 17 pages.

International Search Report; International Application No. PCT/US2013/050823; date of mailing Oct. 21, 2013; 11 pages.

International Search Report; International Application No. PCT/US2013/050825; date of mailing Oct. 21, 2013; 11 pages.

International Search Report; International Application No. PCT/US2013/050837; date of mailing Jan. 2, 2014; 17 pages.

International Search Report; International Application No. PCT/US2013/050839; date of mailing Jan. 8, 2014; 16 pages.

International Search Report; International Application No. PCT/US2013/050826; date of mailing Dec. 3, 2013; 17 pages.

\* cited by examiner

SYSTEMS AND METHODS FOR NETWORKING CONSUMER DEVICES

FIELD OF THE INVENTION

The present application relates to systems and methods for networking consumer devices.

BACKGROUND OF THE INVENTION

Low-power, personal area networks such as ZigBee, Z-Wave, Insteon, JenNet-IP, X10 or similar are becoming increasingly prevalent. Appliances, lighting, heating and cooling, security and monitoring systems, entertainment systems, communications, lawn sprinklers, etc., now include microprocessors and wireless communication devices to allow for wireless connection to a home network. Controls for these devices can reside in smartphones, PDAs, laptop computers, desktop computers or other devices on which a user-friendly software control interface may exists or controls may reside in a network cloud.

Several different ways to organize and configure these home networks exist. Existing technologies can associate devices into groups based on the ability to communicate using visible light, ultrasound, infrared light, radio frequency and other communications technologies, thereby enabling the devices to be organized into clusters based on the confined space in which they reside, as well as the kind of devices they represent. Integrating a microprocessor into the individual devices allows the devices to receive programming that enables a high degree of flexibility for the user. The large number of available configurations, however, can overwhelm the typical user. In fact, many of the network technologies for home networks are relatively complicated and difficult for the consumer to use. Adding, authenticating and configuring new devices may involve the hiring of a trained technician to carry out the installation.

As the costs of microprocessor, memory, displays, radio transmitters and receivers and line of sight communications decrease, however, the cost of adding these capabilities to inexpensive and even disposable consumer products becomes possible. The increase of capabilities and the number of networked home devices may lead to a new set of challenges for the consumers and the home networks.

SUMMARY OF THE INVENTION

In one embodiment, a method for enrolling nodes into an ad hoc network associated with a multi-roomed structure, each node comprising a communication module configured to communicate with the ad hoc network using at least one of room-limited communications and room-transparent communications, the method comprising: transmitting by a first node in the ad hoc network a first room-limited communication; determining at a second node in the ad hoc network whether the first room-limited communication was received; when the first room-limited communication was received, segmenting the first and second nodes into a single room in a room list stored in memory; and receiving stock keeping unit (SKU) numbers from at least one of the first and second nodes in the ad hoc network.

In one embodiment, a method for enrolling nodes into an ad hoc network associated with a multi-roomed structure, each node comprising a communication module configured to communicate with the ad hoc network using at least one of room-limited communications and room-transparent communications, the method comprising: transmitting by a first node in the ad hoc network a first room-limited communication; determining at a second node in the ad hoc network whether the first room-limited communication was received; when the first room-limited communication was received, segmenting the first and second nodes into a single room in a room list stored in memory; receiving stock keeping unit (SKU) numbers from at least two of the nodes in the ad hoc network; and defining at least one circuit based on the received SKU numbers.

In one embodiment, a method for enrolling nodes into an ad hoc network associated with a multi-roomed structure, each node comprising a communication module, the method comprising: instructing, through wireless communications, a first node in the ad hoc network to transmit a room-limited communication; receiving from a second node an indication of whether the first room-limited communication was received by the second node; and when the first room-limited communication was received by the second node, segmenting the first and second nodes into a single room in a room list stored in memory.

In one embodiment, a system, comprising: an ad hoc network comprising a plurality of nodes, the plurality of nodes comprising a bridge node, a first node and a second node, wherein each of the first and second node each comprise a communication module configured to communicate using at least one of a room-limited communications and room-transparent communications, wherein the bridge node comprising a controller and memory, wherein the controller is configured to: instruct, through wireless communications, the first node in the ad hoc network to measure an ambient lighting level; instruct, through wireless communications, the second node in the ad hoc network to transmit a room-limited communication; receive from the first node an indication of whether the first room-limited communication was received by the first node; and when the first room-limited communication was received by the first node, segment the first and second nodes into a single room in a room list stored in the memory.

DETAILED DESCRIPTION OF THE EMBODIMENTS

Various non-limiting embodiments of the present disclosure will now be described to provide an overall understanding of the principles of the structure, function, and use of the systems and methods disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

General Node and Non-Lighting Device

Figure 1:
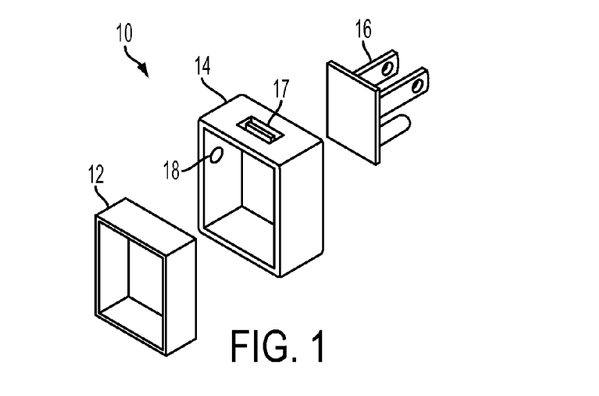
FIG. 1 shows an embodiment of a consumer product device.

FIG. 1 shows a simplified view of an example consumer product device 10 having network capability. The consumer product device 10 has an adapter 12 that contains, or is otherwise associated with, a consumer product. The adapter 12 can be any suitable receiver, socket, receptacle, container, or other structure for containing, attaching, or otherwise associating with a consumer product. The consumer product may be any suitable type of consumer product. For example, the consumer product may be a consumable product dispenser that dispenses or delivers some type of consumable product such as shaving cream, air freshener, toothpaste, lotion, shampoo, cotton swabs, razor blades, tissue, etc. The consumer product may be, for example, a non-powered implement such as a razor, a toothbrush, a hair brush, a duster, a broom, a mop, a scrub brush, a toilet wand, etc. The consumer product may be a powered device, such as a coffee maker, a toaster oven, a television, a hair dryer, a vacuum cleaner, air purifier, humidifier, etc. The consumer product may be a powered device that includes a battery for an energy source, utilize other types of energy sources, or utilizes a combination of energy sources. Some consumer products may utilize one or more energy harvesting sources that are configured to generate energy based on motion, temperature, solar power, or motion, for example. By way of example, in one embodiment, the act of squeezing a product during the act of dispensing generates the necessary action to generate power by an energy harvesting source associated with that product. In another example, the act of moving a switch from a first position to a second position may induce an electrical current to generate power. As is to be appreciated, however, these particular examples are merely illustrative non-powered and powered products, no limitation to any particular product or configuration is intended nor should any be inferred. Consumer products, as defined here, do not have any networking communication capability. Communications on these devices only take the form of local communications, such as user interfaces, warning lights, audio transducers, etc.

In some embodiments, the adapter 12 may snap onto or otherwise allow the consumer device to be mechanically connected, and possibly electrically connected, to the consumer product device 10. For powered devices, the device 10 may include a standard 2 or 3 pronged receiver such as seen in power outlets, or any other suitable type of power connector, illustrated as power connector 16.

The consumer product device 10 also includes at least one communication module or hub 14. The communications hub may comprise one communication module, or several communication modules, each using a different type of communication technologies. For example, the communication module may consist of a room-limited communication module. As used herein, "room-limited" means that the communication medium of the communication module 14 uses forms of communications signals configured to not penetrate barriers, such as walls, floor, closed doors and ceilings. Examples signals include line of sight signals, such as optical signals, and some types of acoustic signals. The communication modules 14 may also alternatively or additionally include, a room-transparent communication module. As used herein, "room-transparent" means that the communication medium of the communication module 14 is configured such that it is not limited by barriers, such as walls, floors or other types of structures. These barriers may lessen the relative strength of the signal as the signal propagates, but they generally do not stop it. Example "room-transparent" signals includes various radio frequency signals, subsonic signals, among others. The communication hub 14 may contain one or both of these types of modules, and may contain more than one of each type, such as two room-limited modules and one room-transparent, etc. each with its own capability to communicate with and connect to other devices in an ad hoc mesh network, as described in more detail below.

The network capability provided by the communication module 14 generally allows devices that would not otherwise have the ability to join and leave an ad hoc mesh network and to communicate with other devices that may also not otherwise have that ability. Providing devices and products the ability to communicate and coordinate with other devices allows a user to manage many aspects of his or her household or other type of environment, such as an office complex, a commercial facility, or other type of area or space that includes consumer products or other types of trackable units.

The power connector 16 may electrically couple to the communication module. Therefore, in some embodiments, the power connector provides power to the communication module and may provide power to the consumer product portion of the device. While a power connecter 16 having a three prong plug is illustrated in FIG. 1, the communication module 14 may receive power from any suitable power source. Thus, the communication module 14 may receive its power from a power outlet or a battery through the power connector 16. In some embodiments, the power connector 16 may comprise a wireless power receiver. A base device may transmit a signal to a receiver that can convert the signal into power for the receiver. In some embodiments, the power connector 16 may utilize energy harvesting to deliver energy to the communication module 14. For example, physical movement of a product associated with the consumer product device 10 may inductively generate current and/or voltage which can be used as a power source.

The consumer product device 10 may include a number of types of power connectors. The consumer product device 10 may be configured such that the communications module 14 have extended range when connected directly to a power source, or otherwise alter their operations depending on the type of power source available.

In embodiments, as illustrated in FIG. 1, the consumer product device 10 includes a sensor 18. While one sensor 18 is shown, any suitable number of sensors may be used. The sensor 18 may allow the user to track a level of consumable product within the receiver 12. For example, if the consumer product consists of a dispenser of some sort, the sensor 18 may be a light sensor (i.e., a photodiode). The light sensor may be positioned such that light to the sensor is blocked by the consumable product when the level of the consumable product in the dispenser is above a certain threshold relative to the sensor 18. When the level of the consumable product in the dispenser decreases below the threshold, ambient light would reach the sensor, a signal is generated by the sensor indicating that the dispenser is nearly empty. Other types of sensors may include heat sensors, weight sensors, accelerometers, temperature sensors, diagnostic sensors, air quality sensors, VOC (volatile organic compounds) sensors, flow sensors, pressure sensors, etc. When the sensor 18 detects the presence of a certain state (i.e., a low product level), one or more actions may be triggered using the network capability of the consumer product device 10, as described in more detail below.

In some embodiments, the consumer product device 10 may have a direct connection communications port 17, such as a Universal Serial Bus (USB) or IEEE 1394 (Firewire) port, an RJ45 port, a Thunderbolt port, or any other type of port associated with other various communication protocols. Port 17 may provide the user the ability to connect the consumer product device 10 to a computing device. Through this connection, the device 10 may receive an initial set up or programming and upgrades to the firmware or software, for example. The port 17 may also allow the device to be directly connected to a consumer device having a similar port, such as a television, remote control, or music system, for example. The port 17 may also allow connection to a network access point or gateway to provide connection to an external network like the Internet. In some embodiments, the consumer product device 10 may additionally or alternatively include a wireless communication port. The wireless communication port may utilize any suitable communication protocol, or combination of communication protocols, such as a Bluetooth® protocol, a Wi-Fi communication protocol, and so forth.

Figure 2:
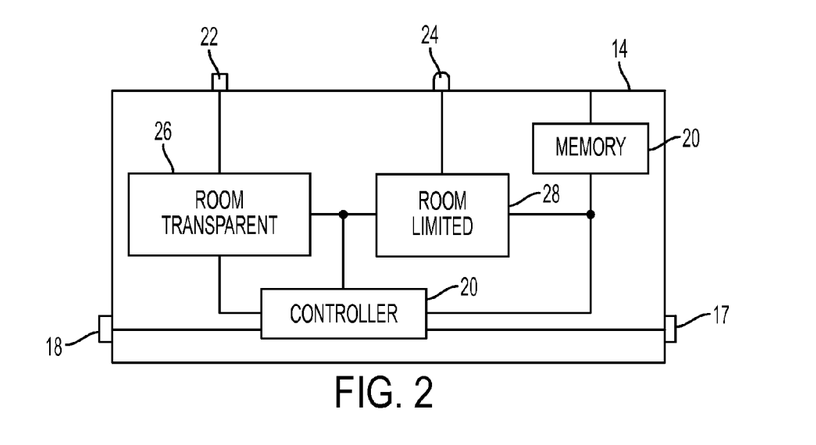
FIG. 2 shows a block diagram of an embodiment of a communications portion of a network device.

FIG. 2 shows a schematic view of an example of the communication module 14 that provides the network capability. The module may contain a room-transparent module 26 and a room-limited communication module 28.

The room-transparent module 26 may communicate by way of one of many different types of protocols, including a packet-based protocol such as the Internet Protocol. With specific regard to embodiments utilizing the Internet Protocol, the protocol may be one of IP version 6 (IPv6), such as IPv6 over Low Power Wireless Personal Area Networks (6LoWPAN), or the Neighborhood Exchange Protocol, for example. In some embodiments, the room-transparent module 26 may provide wireless local area network (WLAN) data communications functionality in accordance with the Institute of Electrical and Electronics Engineers (IEEE) 802.xx series of protocols, such as the IEEE 802.11a/b/g/n series of standard protocols and variants (also referred to as "Wi-Fi"), the IEEE 802.16 series of standard protocols and variants (also referred to as "WiMAX"), the IEEE 802.20 series of standard protocols and variants, the IEEE 802.15.4 series of standard protocols and variants, and others.

The room-transparent module 26 may comprise, or otherwise be in communication with, various radio elements, including a radio processor, one or more transceivers, amplifiers, filters, switches, and so forth to provide data communication functionality. It may be appreciated that the room-transparent module 26 may operate in accordance with different types of wireless network systems that utilize different radio elements to implement different communication techniques. The room-transparent module 26 also may comprise various input/output (I/O) interfaces for supporting different types of connections such as a serial connection port, an IR port, a Bluetooth® interface, a network interface, a Wi-Fi interface, a WiMax interface, a cellular network interface, a wireless network interface card (WNIC), a transceiver, and so forth. The room-transparent module 26 may comprise one or more internal and/or external antennas to support operation in multiple frequency bands or sub-bands such as the 2.4 GHz range of the ISM frequency band for Wi-Fi and Bluetooth® communications, one or more of the 850 MHz, 900 MHZ, 1800 MHz, and 1900 MHz frequency bands for GSM, CDMA, TDMA, NAMPS, cellular, and/or PCS communications, the 2100 MHz frequency band for CDMA2000/EV-DO and/or WCDMA/JMTS communications, the 1575 MHz frequency band for Global Positioning System (GPS) operations, and others. Through the room-transparent module 26, the device 10 may receive an initial set up or programming, as well as upgrades to the firmware or software, for example. The room-transparent module 26 may also allow the device to communicate with other devices, such as a television, remote control, or music system, for example. By way of communications from the room-transparent module 26, a connection to a network access point or other type of gateway may facilitate connection to an external network, such as the Internet.

The room-limited communication module 28 may be a line of sight communication module, utilizing infrared light, visible light, ultrasound and/or other acoustic signals, for example. When a receiver is not within sight of the transmitter, the receiver will not receive the signal. The line of sight communication module may be in communication with an emitter 24 for broadcasting the room-limited communication. In some embodiments, the emitter 24 is a component of the consumer product device 10. In some embodiments, a consumer product (not shown) associated with the consumer product device 10 may be operated to function as an emitter of room-limited communication. One example of this configuration includes a lighting element, such as a light bulb, that is associated with the consumer product device 10. As described in more detail below with reference to FIG. 14, the room-limited communication module 28 may be configured to turn the light bulb on and off at a particular frequency at a particular time to provide a light of sight communication signal to other consumer product devices in optical proximity. By utilizing a room-limited communication having a particular frequency, the circuitry of the receiver may be specifically tuned for that frequency, thereby improving the signal-to-noise ratio during optical detection. Other embodiments can use other techniques for transmitting the room-limited signal. In some embodiments, the room-limited communication broadcasted by the emitter 24 may comprise data, such as in a modulated format or using other techniques to embed data in the communication signal. Thus, the room-limited communication module 28 may be configured to transmit a variety of signals utilizing any suitable communication protocol.

The communication module 14 may comprise other components. For example, a memory 20 may reside within the communication module 14 (as illustrated), elsewhere in the device, or it may be a networked or remote memory such as is common in cloud computer. While a controller 20 is illustrated as part of the communication module 14, other embodiments may have a controller 20 separate from the communication module 14, such as a networked controller. In some embodiments a central device controller may be used to control multiple communication modules 14. In addition to sensors configured to sense the state of a products associated with the consumer product device 10, other types of sensors may exist on the consumer product device 10, or a sensor may reside on its own node that is not locally associated with a consumer product, but is a member of the ad hoc network. The sensor may be a security sensor, a radio frequency identification tag, a barcode reader, a near field communication (NFC) sensor, or an environmental sensor, motion sensor, sound sensor, odor sensor, smoke alarms, airborne particulates sensor, pollen and dust sensor, air purification system, metrology, airborne biological agents sensor, bacteria and viruses sensors, surface borne contaminants sensors, sanitary sensors, water quality sensors, moisture sensors, etc. Environmental sensors may sense air quality, light level, light quality, temperature, air flow, or other environmental conditions. For example, a sensor sensing the air quality may determine that the room needs freshening and can send a signal through the network to a consumer produce device associated with an air freshener to freshen the air through activation of the air freshener. For lighting applications, the sensor may send information about the light level that would cause one or more of lighting devices to turn on, turn off, or dim. Lighting devices as nodes are discussed in more detail below.

Lighting Products

In one example embodiment, the consumer product associated with the device 10 may be a lighting product. The term "lighting product," as used herein, broadly refers to any form of light bulb or illumination element, that screws or otherwise inserts into a socket or receptacle to selectively receive power from a power source. In this regard, lighting products may include traditional incandescent bulbs, LED bulbs, LEDs, compact fluorescent (CFL) bulbs, among others. Further, "lighting product" may also refer broadly to lamps, ballasts, lighting fixtures, and other devices that receive various types of light bulbs or lighting elements and that can be switched and/or dimmed. The power source delivering power to the lighting product may vary based on implementation. Example power sources include, but are not limited to, a battery source, an electrical grid, an induction-based power source, a solar-based power source, a sonic-based power source, combinations of differing types of power sources, and so forth.

Figure 3:
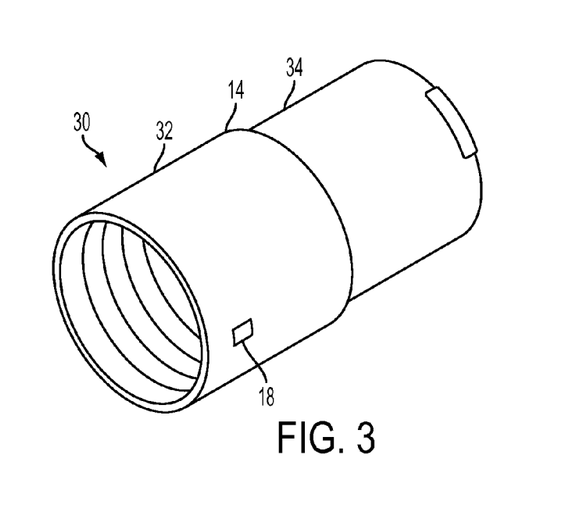
FIG. 3 shows an embodiment of a lighting device.

FIG. 3 shows an embodiment of a consumer product device that is an adapter 30 to be used with a lighting product (not shown). In the illustrated embodiment, the adapter 30 comprises a communications module 14 that is integral with a part of a housing. The housing also comprises a light emitter receptacle 32, which in the illustrated embodiment, is configured to accept a light bulb having a screw-type base, although this disclosure is not so limited. The adapter 30 also comprises an insertable portion 34 which may be generally configured to be inserted into a light socket or receptacle that typically would receive the lighting product. In the illustrated embodiment, insertable portion 34 is threaded and is structurally similar to the threaded portion of a standard light bulb such that is can be received by a standard socket. A user can insert a lighting product, such as a household light bulb, into the light emitter receptacle 32 and then insert the insertable portion 34 into a standard light socket. As is to be appreciated, the particular structural arrangement shown in FIG. 3 is merely illustrative of one example non-limiting embodiment. The particular structural arrangement of any particular adapter may vary without departing from the scope of the present disclosure. For example, some geographical regions may utilize adapters having a first structural configuration while other geographical regions may utilize adapters having a second structural configuration. Accordingly, use of the term "light socket" is not intended to be limiting, but rather is merely used as one example type of structural arrangement. Further, in some embodiments, the components of the adapter 30 may also be integral with a lighting product in a non-separable arrangement.

Figure 4:
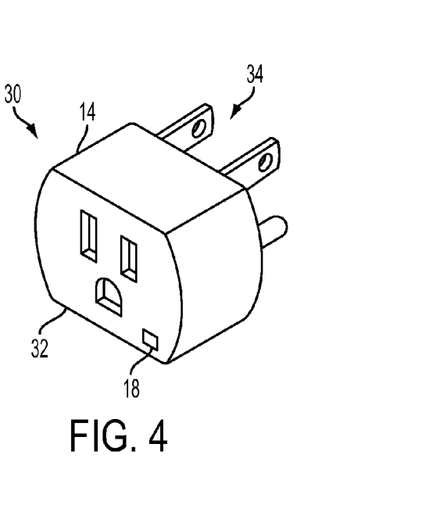
FIG. 4 shows an alternative embodiment of a lighting device.

While FIG. 3 illustrates one example configuration of the light emitter receptacle 32, a variety of other embodiments are possible. FIG. 4, for example, illustrates an embodiment of an adapter 30 having a light emitter receptacle 32 that takes the form of a socket that is structurally similar to that of a power outlet. In this embodiment, the adapter 30 may include an insertable portion 16 that comprises a three-prong arrangement, similar to the power connector 16 of the back side of the consumer product device 10 in FIG. 1. The adapter 30 of FIG. 4 may also comprise a communication module 14 that has one or both of the room-limited communication module and the room-transparent communication modules, as discussed in detail above. The light emitter receptacle 32 of FIG. 3 may accept the plug of a power cord of any suitable light bulb, a light, lamp or other illumination device having a plug. The light emitter receptacle 32 may also receive other suitable power connectors, such as a power connector associated with a light having an integrated power connector, as seen in emergency lighting, for example. Moreover, in some embodiments, the adapter 30 is integral with a standard wall socket, an extension cord, a power strip, surge protector, or other electrical component.

Similar to the device 10 illustrated in FIG. 1, the adapter 30 of FIGS. 3 and/or 4 may also include a data collection device, such as sensor 18. The sensor 18 may be a light sensor, such as a photodiode. In other embodiments, the sensor may be a temperature sensor, a smoke detection sensor, a proximity sensor, or any other suitable sensor or data collection device, or collection thereof. The sensor may communicate with a controller (i.e. controller 20 of FIG. 2) resident in the adapter 30, or it may communicate with a controller located on other lighting devices or non-lighting devices in an associated ad hoc network. The controller may control a power connection to switch power to the light emitter on or off, as dictated by inputs from the sensor. In some embodiments, the switching may alternatively or additionally be controlled with user inputs on lighting levels desired for particular times of day, activities, or other factors, for example.

A lighting product and associated adapter 30 may form an ad hoc mesh network of networked nodes, in which various devices (such as consumer products, lighting device, non-lighting devices, etc.) enter and exit the network at will, and all devices in the network may communicate with any and all devices within its range. While there may be a central controller, each device may also have its own controller. In some embodiments, one node may provide control signals to the other nodes. The control signals may be transmitted using room-transparent signaling, room-limited signaling, or a combination of room-transparent signaling and room-limited signaling. In accordance with known ad hoc mesh network protocols, a node of the network may be bridge node that has the ability to bridge the ad hoc mesh network to other networks.

Figure 5:
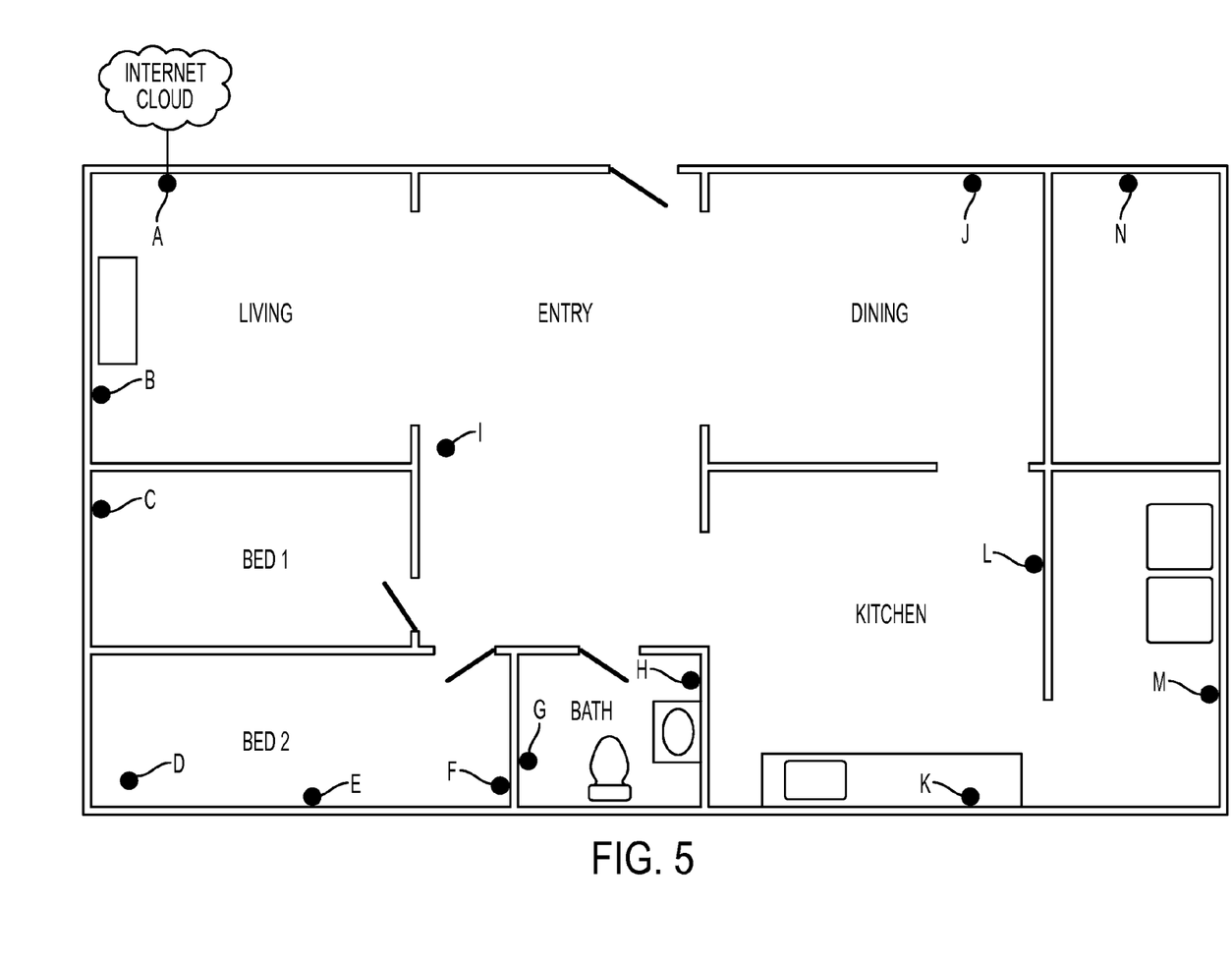
FIG. 5 shows a diagram of an embodiment of a structure having multiple, potential nodes in an ad hoc wireless network.

The discussion to this point has focused on providing consumer products with an ability to form ad hoc, wireless mesh networks. The consumer products may have intelligence ranging from relatively 'dumb' such as light bulbs, sweepers, air fresheners, etc. to high sophistication, such as in consumer electronics and computing devices. Having networks of devices with these capabilities may allow a user to segment the nodes of the network into rooms of the house or structure without any prior knowledge of its floor plan. Room List/Room ID FIG. 5 shows an example of a floor plan of a house. The techniques employed here may apply, however, to any type of structures or environments, such as office buildings, hospitals, hotels, manufacturing facilities, shipping yards, stadiums, apartment complexes, airports, and warehouses, for example. Merely for the purposes of illustration, this discussion focusing on consumer products within a house. No limitation from this selection was intended or should be implied. The nodes in an ad hoc network reside in the rooms, but the particular floor plan, or an identification of various room types within the structure (i.e., bathroom, bedroom, etc.) do not necessarily have to be inputted to the system by a user of the system. Instead, a master node, bridge node, or other controller may analytically determine a floor plan and room types of a structure based on a combination of room-transparent and coordinated room-limited communications between the nodes throughout the structure. One should note that the user of the techniques and embodiments is not necessarily a human consumer. The 'user' may be a computing device employed by a human consumer to gather this information so that the human does not need to do so. The nodes illustrated in FIG. 5 may be associated with a variety of consumer products and devices. Merely by way of example, node A may be associated with a wall outlet, node B may be associated with a floor lamp, node E may be associated with an air freshener, node J may be associated with a light switch, node L may be associated with an appliance, and so forth.

Figure 6:
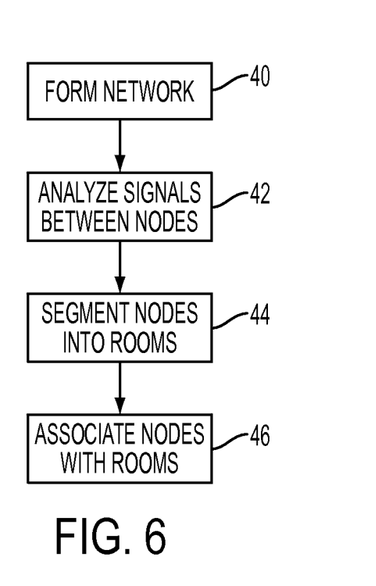
FIG. 6 shows a flowchart of an embodiment of a method of building a room list.

FIG. 6 shows a flowchart of an embodiment of a method of determining which nodes reside in which rooms. At 40, the ad hoc mesh network is formed. This may involve deploying the nodes and then having them broadcast signals notifying any nodes in the area of their presence. The nodes may be lighting products or consumer products such as those previously discussed. As part of forming the network, the nodes may send out their signals and determine the presence of other nodes.

At 42, the signals between nodes of the ad hoc mesh network are analyzed. This analysis may occur in one or more locations, such as in the network, in a node, in the cloud, in a computer device, such as a desktop computer, in a handheld computing device, such as a smartphone or tablet computer, and so forth. Referring to the floor plan of FIG. 5, some nodes will 'see' nodes that other nodes cannot 'see,' where 'seeing' a node means detecting the presence of the node, such as through a detection of a room-limited signal. For example, node I may see nodes J, A, and H. However, node J may also see node L and node K. Node K can see node M. By analyzing the signals, it can be determined that node J cannot see node M, so a wall or other obstruction must exist between nodes J and M at the time of the signaling. Similarly, Node I can see node H through the doorway, but node I cannot see node G, even though node I knows of the existence of node G through information from node H.

Beyond this analysis, the nodes can also determine distances between themselves. A receiving node can determine the time of a transmission from another node and from that determine the distance between nodes, although not necessarily the orientation. Using these two types of analyses, as examples, one can determine rooms within a structure. Relying on the line of sight data, one can segment the nodes into rooms. Even further, relying upon the received signal strength, the network may be able to determine approximate dimensions of the rooms. The nodes have multiple ways of detecting each other, such as optically, electrically, using sensors, etc. In some embodiments, nodes are incorporated into outlets, light switches, and other components typically mounted on a wall of a structure. Such nodes may aid in the determination of the approximate dimensions of the rooms in which they are associated, as they are likely positioned at the boundary lines (i.e. walls) of the rooms.

The above analysis assumes only the use of a room-limited communication module. In some embodiments, one or more of the nodes may also use a room-transparent communication module. In this instance, the nodes may identify themselves without relying upon room-limited communication. By coupling this data with the line of site data, the network can identify walls and openings between nodes and segment the nodes into rooms at 44. For example, referring to FIG. 5, node I may be aware of the existence of node C based upon the room-transparent communication module. However, looking at the room-limited signals, node I would not be able to detect the presence of node C, indicating a wall or other barrier is lying between them. Moreover, analyzing the absence or presence of room-limited communications over time, additional intelligence may be gathered about the structure. For example, a door may be positioned between two nodes in a given structure. When the door is open, room-limited communications may be transmitted between the two nodes. When the door is closed, room-limited communications will not be transmitted between the two nodes. Accordingly, based on the presence or absence of the room-limited communications between the two nodes, the position of the door can be deduced.

Further, various states, activities, or occurrences may be alternatively or additionally deduced through analysis of room-transparent communications. For example, the signal strength of a room-transparent communication between two nodes may decrease if a door between the two nodes is moved from an open position to a closed position. In another example, a node is attached to the collar of a pet, and as the pet roams the house, the relative signal strength for communications between the collar node and other nodes throughout the house can be measured to determine a real-time position of the pet in the house. In yet other example, a node associated with a person can be tracked to ascertain the position of the person within the house. Thus, as the person moves throughout the house, various activities can be triggered. As described in more detail below, such activities can include turning lights on/off, turning appliances (i.e., coffee makers) on/off, controlling HVAC units, security systems, and so forth. In some embodiments, a node may be associated with a cleaning tool. When movement of the cleaning tool is detected, a music system is turned on. Once the nodes are segmented into rooms, the node information is updated to associate nodes with particular rooms at 46. One of the nodes on the network may include nonvolatile memory, or the nonvolatile memory may reside external to the network, but in communication with one of the nodes. The room list and nodes associated with the rooms may be stored in this memory. The node upon which the nonvolatile memory, or has the link to the nonvolatile memory, may be a bridge to another network, such as the Internet. As one or more nodes within the ad hoc network may be attached to or involve consumer products that may either be moved by a user or may themselves be mobile, this process may be repeated to acquire updated information. The process may be repeated periodically (such as hourly, daily, or weekly, for example), based on a triggering event (addition/removal of a node), or may be repeated when requested by a user, for example.

One should note that while the process illustrated above concentrates on the segmentation of the nodes into rooms, it is possible to also segment the devices into additional or alternative types of segments, such as segmenting them by user, type of device, etc. Accordingly, while this discussion focuses on the segmentation by room, the use of other types of segments should be considered within the scope of the embodiments presented here.

Room Purpose

Figure 7:
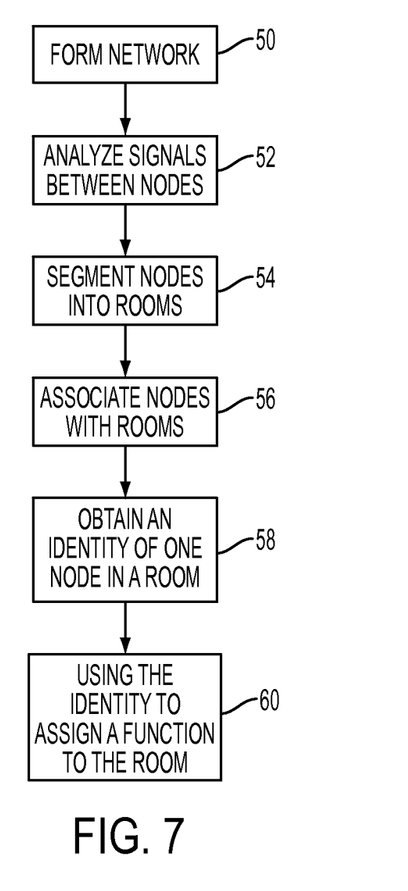
FIG. 7 shows a flowchart of an embodiment of a method of assigning a function to a room.

Once the nodes are segmented into rooms and nodes associated with those rooms are identified, a purpose for each room may be determined. FIG. 7 shows a flowchart of an embodiment of a method of assigning a purpose to the room. Processes 50-56 mimic those of FIG. 6 with similar, if not the same, analysis of the signals to segment the nodes into rooms. The nodes form the network at 50, and the signals between the nodes are analyzed. The analysis may occur, for example, at each individual node, at a master node, if one is designated, in the network, in the cloud, in a computer device, such as a desktop computer, in a handheld computing device, such as a smartphone or tablet computer, or any combination thereof. Having segmented the nodes into rooms, the network then obtains the identity of one of the nodes in a room at 58.

Obtaining the identity of one of the nodes in a room may be based on any number of identification processes. For example, the nodes themselves may have information they encode into the signals they transmit, such as a device identifier, a stock-keeping unit number, a name, etc. In some embodiments, this information is transmitted in the node's room-transparent communications. In some embodiments, this information is transmitted in the node's room-limited communications. In yet other embodiments, this information is transmitted in both the node's room-limited and room-transparent communications. In some embodiments, the user may provide this information into the node when activating the node. The information may be provided using any suitable technique, such as using the USB port or a resident interface on the node, such as a wireless interface, for example. In some embodiments, the user may interact with the node through an application executing on a computer device. In any event, the node may store this information along with what will be referred to herein as 'node data.' The node data may include any information about the node, such as the type of device at the node, the device state (such a full or nearly empty, for example), its power status, what other nodes to which it is connected, etc.

In one embodiment, the node data comprises at least of an identifier for the consumer product device residing at the node. That node or another node on the network accesses a database of identifiers and uses the identifier as an index into the database. The resulting information provides the network with more information about the node. For example, the consumer product device may have as an identifier a stock-keeping unit (SKU) number. Accessing a database results in the SKU being identified as a toothbrush. Other types of identifiers may also exist. The identifier may be a bar code, a network address, a RFID-based code, a presumed identity based upon an analysis of surrounding devices or information about the environment, etc. Based upon this information, a room function may be assigned to the room at 60, in this example in which the toothbrush resides as a bathroom.

The database may also take many forms. It may be a fully populated product database, a small look up table, or any other suitable format. The database may reside in nonvolatile memory on a node in the network, or it may reside external to the network but accessibly through a link to the external network, such as at the bridge node.

Accessing the database may also occur in layers. A first database may identify a particular device as a toothbrush, triggering access of a second database that provides more information about the toothbrush, such as a model number or brand name. In one embodiment, the database accessed may comprise of a database populated by consumers who have similar networks and may have better insight into assigning the function into the room.

The database may be organized in many different ways. In one embodiment, the database comprises a table of nodes, a table of rooms, and associations between the table of nodes and the table of rooms. In another, the database is a table of nodes in the wireless network, a table of rooms in the house, a list of room functions, and associations between the room functions, the rooms, and the nodes. The associations may be updated over time as nodes move between rooms, leave the network, as products associated with the nodes are used, or new nodes are added to the network, for example.

In one embodiment, information contained in the room list may prove useful in assigning a function to the room. The room function may be assigned based upon a historical or previous room list, a current node function list, a historical node function list, current node location data, historical node location data, current sensor data, historical sensor data, user preference data, an external database of room functions, blueprints of the structure, and external data related to the structure.

In some embodiments, the identification of a room may be based on the node data gathered from two or more nodes within a room. For example, if a first node in a room is identified as a hand soap dispenser, the room associated with the hand soap dispenser could possibly be a kitchen or a bathroom. Once a second node in the room is identified as a dishwasher (or other product that is customarily in a kitchen), the system could conclude the first node is in a kitchen.

Actions

Figure 8:
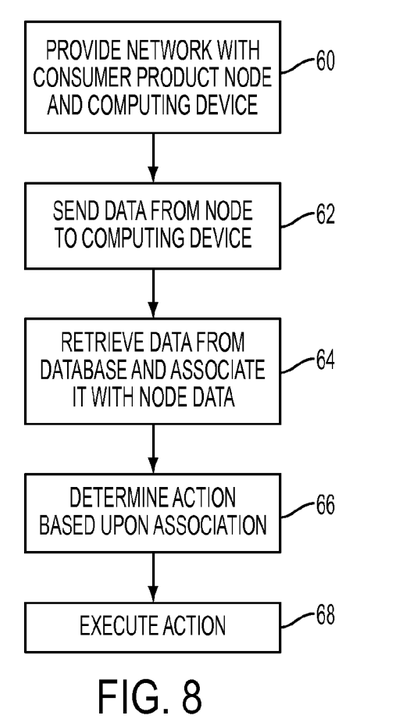
FIG. 8 shows a flowchart of an embodiment of a method of determining and executing an action based upon a configuration of an ad hoc, wireless network.

Having identified a purpose for the room, actions may be taken based upon the room purpose and the nodes in the room. An embodiment of this process is shown in FIG. 8. In one embodiment, at 62 the ad hoc network has a node associated with a consumer product, such as an air freshener dispenser. As it to be readily understood, however, nodes may be associated with any type of consumer product device as discussed with regard to FIG. 1. In addition, the network has a node with a computing device such as node A, having a link to either an internal or external network, which is sometimes referred to as a bridge node.

At 62, the consumer product node sends data to the computing device node. This data may be node data, discussed above, and may include an identifier of the node, a state of the consumer product, and/or power status, etc. The node data may include information gathered from a sensor at the consumer product node. The computing device may then access a database at 64 to gather more data about the node and associate that data with the node data. The computing device can then make a determination of an action to be taken with regard to the device at the node at 66 and execute that action at 68. The action may be internal or external to the network.

Internal actions may involve altering the function of then node, such as shutting it down, turning it on, slowing it down, reducing its usage, etc. It may involve partner devices to the current node having their operation altered, such as activating another device if one is running out of supplies. It may also involve updating an internal database, such as a shopping list to be provided to a user identifying supplies needed at a particular node, or sending a message to the user within the network.

External actions may involve sending a text message to a user through a link to a cell phone network, sending an email through an Internet gateway and mail client, accessing an e-commerce gateway to order more supplies, accessing information about the devices residing at a node from an external database, or any other suitable external action.

For example, assuming the node has an air freshener dispenser, the node data may include an identifier identifying the device as an air freshener and a status indicating an amount of freshener remaining in the reservoir. The node transmits this data to the computing device. The computing device accesses a database, either internal or external, and determines that based upon that amount, the reservoir is nearly empty. The database in this instance may merely be a list stored in a memory. The computing device then identifies different actions based upon the reservoir being nearly empty. The device could contact the user to notify the user of the status (e.g., via a text message, email message, or instant message). The device could access an e-commerce gateway and cause more air freshener to be ordered. The device could also shut the air freshener down to avoid burning the air freshener device out. The device could instruct another node associated with an air freshener to commence operation.

The actions or activities triggered by various conditions detected by the nodes may be also be interconnected, such as when a first condition is satisfied at a first node, certain activities are triggered at other nodes. Thus, if it is determined that a user is cleaning the house (i.e., through detecting movement of a node associated with a mop), a series of events may be initiated. Such events may be user-defined, such as setting the lights to a certain setting, turning on an entertainment system, opening curtains, dispensing air freshener, and so forth. Other detected events may trigger other activities. For example, if it is determined that the house has not been occupied for a certain number of hours (or days), lights throughout the house may be cycled on and off as a security measure. Furthermore, lights in a room can be switched off (or at least dimmed) if it is determined that an occupant of the room has left the room.

The selection of the action, or actions, to execute may involve inputs from sensors, user inputs, previous conditions set by the user, etc. For example, a sensor may detect that an air flow through an air filter has dropped below a particular threshold, indicating that the filter needs to be cleaned or changed. This information would assist in the network selecting the action to take.

In this manner, the network gains valuable knowledge about the devices at the nodes of the network, allowing the network to provide services to the user automatically. The more tasks and services the network can handle, the easier it makes the use of the products and the network for the user. Other benefits may also arise from having such a network existing in a structure.

Home Discovery

Figure 9:
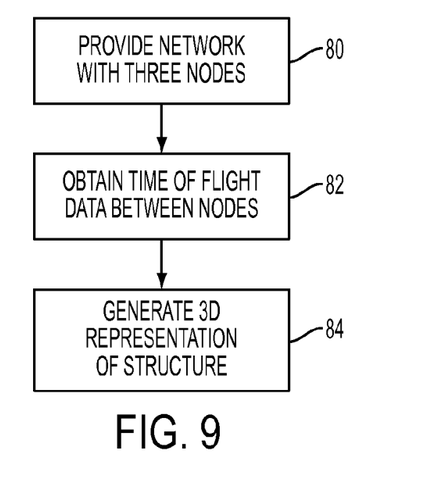
FIG. 9 shows a flowchart of an embodiment of a method of developing a three-dimensional representation of a house.
Figure 10:
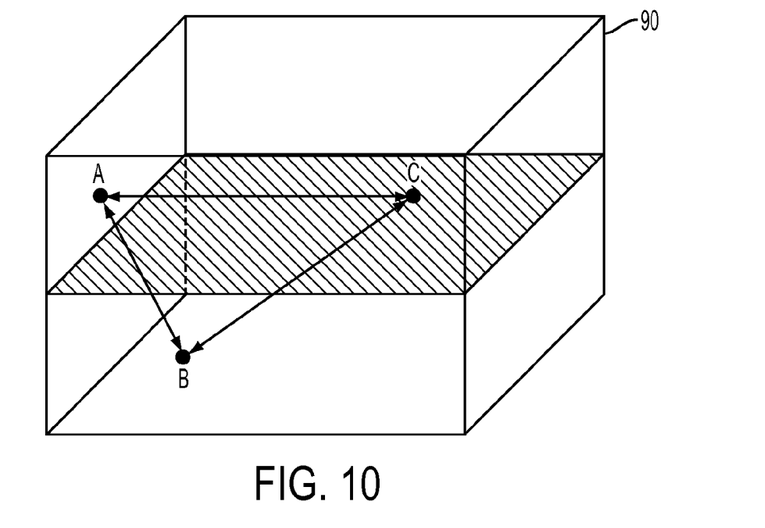
FIG. 10 shows an example of a three-dimensional representation of nodes in a structure.

As mentioned above with regard to determining the layout of the structure, a user may not have blueprints or floor plans available to input to the network. However, the nodes of the network may 'see' the structure differently based on communication signaling between various nodes within the network. Thus, one benefit of the network may lie in its ability to develop a three-dimensional representation of the structure. FIG. 9 shows one embodiment of a method of performing 'home discovery' in which a network of devices generates a three-dimensional representation of the house. While FIG. 9 is illustrated in the context of a home, it should be readily apparent that the systems and methods can be used to determine the layout of any type of structure or environment. At 80, a network is provided that has at least three nodes. The use of three nodes allows the one node to triangulate its position relative to the other two nodes. Generally, the communication modules in these nodes will be the room-transparent modules. Having three nodes provides enough information for the signal analysis and, as one of the nodes may reside on a different floor, the signaling generated by the room-limited modules would not reach that node. At 82, time of flight of the signals between the three nodes is obtained. At 84, signal analysis can generate a three-dimensional representation of the structure, as shown in FIG. 10. In some embodiments, time of flight computation is provided by a chip associated with the room-transparent module, such as wireless microcontroller chips having JenNet-IP network protocol stacks offered by NXP Semiconductors Netherlands B.V.

In addition to the signal analysis, other information may also exist that helps to define the three-dimensional representation of the house, such as type of node and whether the node is mobile. For example, one of the nodes may be attached to a floor sweeper, such as a Swiffer® dust mop. The movement of the floor sweeper during use provides information as to where the non-carpeted floors exist, as well as providing more triangulation data as to the location of the other two nodes. In another example, a node may be attached to a robotic vacuum, such as a Roomba®. In this configuration, carpeted surfaces may be identified, as well as possible information about locations of furniture in rooms. The user could even use a duster or other type of 'wand' structure and map out the structure for the network. Yet another alternative would involve attaching a node to a pet. Other mobile nodes are of course possible.

More information results in a more accurate picture of the house. While the above discussion focuses on the use of the room-transparent communication module as a means of locating the nodes, room-limited modules, as well as room segmentation and room purposes that have previously been identified may also be used. All of this additional information, along with the signal analysis, may be used to generate a three-dimensional representation of the house which may include a room list, a list of nodes within the rooms, a status of a consumer product associated with the nodes, and so forth. This information may be stored within the network or external to it, but accessible by at least one node.

Network Architecture

Figure 11:
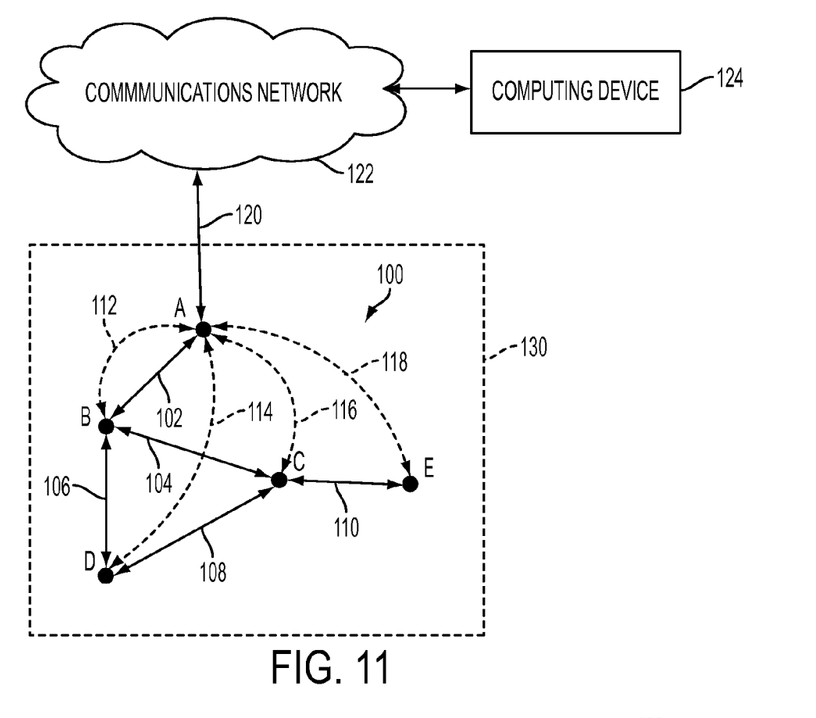
FIG. 11 shows an example network architecture comprising an ad hoc network formed by a plurality of nodes.

FIG. 11 shows an example network architecture comprising an ad hoc network 100 formed by a plurality of nodes A-E. The ad hoc network 100 is contained within a structure 130. As described above, the structure 120 may be a multi-room and/or multi-floor structure, with nodes A-E temporarily or permanently placed through the structure. Various groupings of nodes may be segmented into rooms (not shown) within the structure 130. One or more nodes A-E may be associated with a consumer product, such as a lighting product, for example. One or more nodes A-E may also include a sensor, which may be similar to sensor 18 (FIGS. 1-4). Nodes A-E may also comprise a communication module for facilitating room-limited communications and room-transparent communications.

Various communication channels between the nodes are illustrated in FIG. 11. Nodes A-E are communicating with various other nodes through room-limited communications 102, 104, 106, 108, 110. Since the nodes A-E are placed in rooms through a structure, some nodes are not in communication with other nodes through the room-limited communication signaling. Looking now at room-transparent communication signaling, node A is in communication with each node A-E via room-transparent communications 112, 114, 116, 118. Through room-transparent communications 112, 114, 116, 118, the node A may perform a variety of functions, such as request node data from nodes B-E, initiate functionality at nodes B-E, and so forth.

It is noted that in some embodiments, various nodes B-E may also communicate with each other via room-transparent communications (not shown). Such communications may be used, for example, for time of flight calculations for determining relative distances between nodes within the ad hoc network 100. Thus, while node B and node E, for example, are not in communication via room-limited communications in FIG. 11, node E may still be able to receive and respond to a room-transparent communication sent from node B.

In FIG. 11, node A is functioning as a bridge node and serves to bridge the ad hoc network 100 to a communications network 122 via network communications 120. As is to be appreciated, the communications network 122 can be any suitable type of network and can include a number of computer and/or data networks, including the Internet, and can comprise wired and/or wireless communication links. Furthermore, while node A is serving as the bridge to the communications network 122, this disclosure is not so limited. Other nodes or devices may function as a bridging device.

A computing device 124 may also be in communication with the communications network 122. The computer device 124 may be any type of client device suitable for communication over the communications network 122, such as a personal computer, a laptop computer, or a netbook computer, for example. In some embodiments, the computer device 124 is a mobile communication device, which includes any computer or computing device running an operating system for use on handheld or mobile devices, such as smartphones, PDAs, tablets, mobile phones and the like. For example, a mobile communication device may include devices such as the Apple iPhone™, the Apple iPad™, the Palm Pre™, or any device running the Apple iOS™, Android™ OS, Google Chrome OS, Symbian OS™, Windows Mobile™ OS, Palm OS™ or Palm Web OS™.

In some embodiments, a user interacting with the computing device 124 may also interact with a specialized application, sometimes referred to as an "app," that includes computer executable instructions capable of executing on the computing platform of the computing device 124 to interact with various nodes of the ad hoc network 100. The computing device 124 may additionally or alternatively provide one or more other applications that allow a user to accomplish various tasks with the ad hoc network 100 and/or receive communications generated by a node within the ad hoc network. Applications can include, without limitation, a web browser application (e.g., INTERNET EXPLORER, MOZILLA, FIREFOX, SAFARI, OPERA, NETSCAPE NAVIGATOR) telephone application (e.g., cellular, VoIP, PTT), networking application, messaging application (e.g., e-mail, IM, SMS, MMS, BLACKBERRY Messenger), calendar application and so forth.

Figure 12:
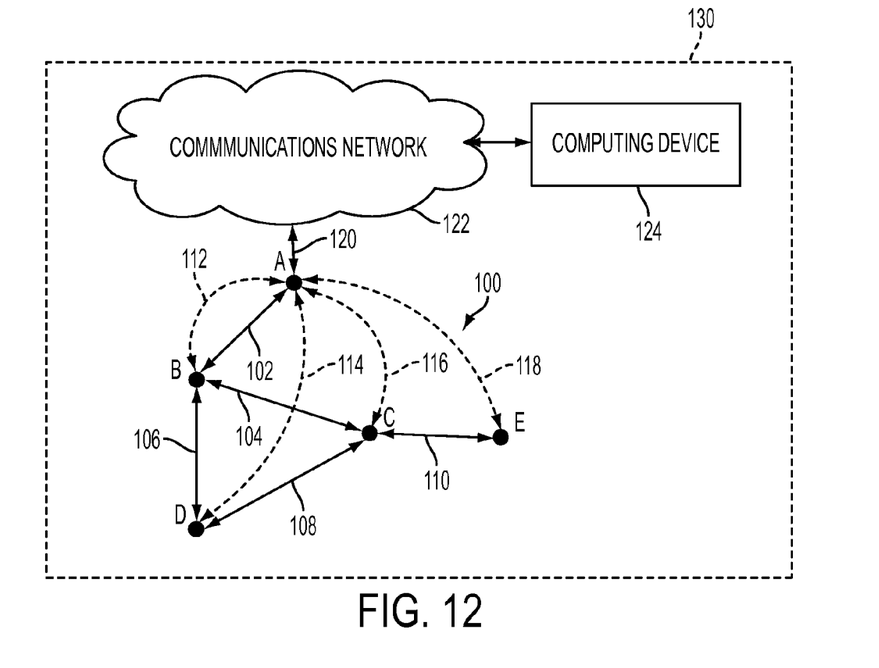
FIG. 12 shows an example network architecture comprising an ad hoc network formed by a plurality of nodes.

FIG. 12 shows an alternate network architecture in which the communications network 122 is local to the structure 130. The communications network 122 of FIG. 12 may comprise computer systems located within a specific local geographic area such as office, home or other indoor and outdoor premises interconnected using a Local Area Network, commonly called, LAN. The LAN may also connect with additional public networks (not shown), such as the Internet. In order to provide wireless extension of the LAN using Wi-Fi, one or more Wi-Fi access points may connect to the LAN. One or more nodes A-E, such as bridge node A, may be in communication with the communications network 122. The computing device 124 may also be in communication with the communications network 122. Similar to FIG. 11, the computing device 124, through its connection to the communications network 122, may control or otherwise receive information regarding various nodes in the ad hoc network 100.

Figure 13:
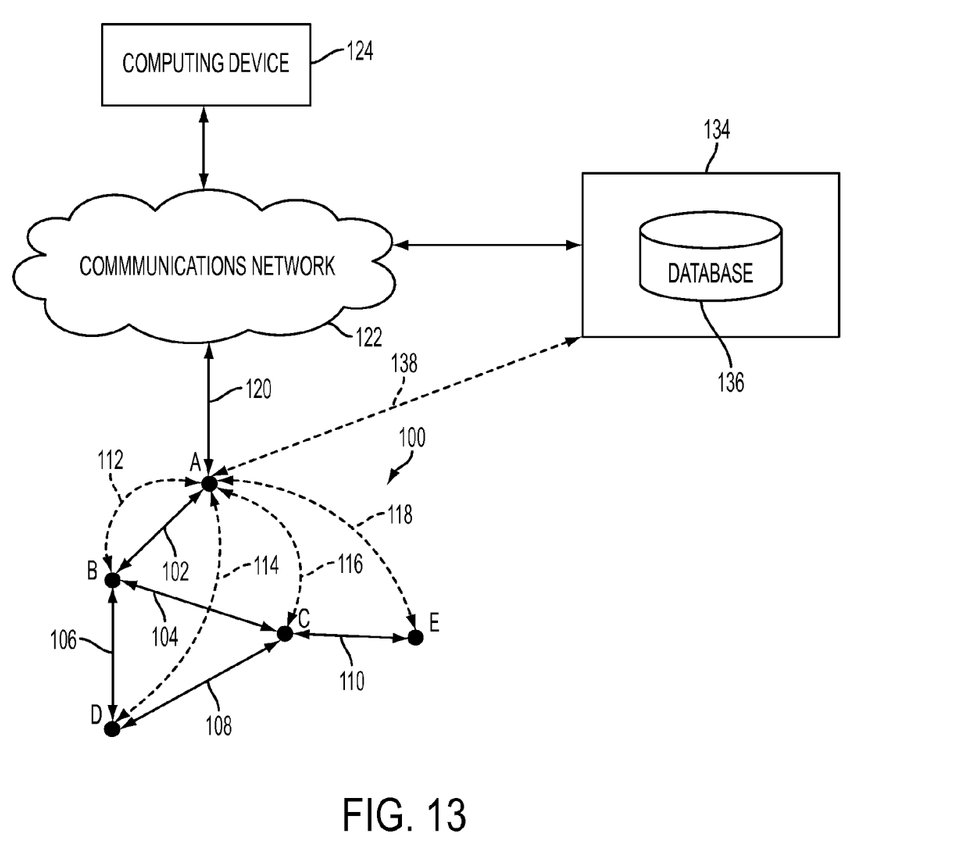
FIG. 13 shows an example network architecture comprising an ad hoc network formed by a plurality of nodes.

FIG. 13 shows an example network architecture that comprises a network device 134 that comprises one or more databases (for simplicity, one databases 136 is illustrated). As described above with reference to FIG. 8, for example, the database 136 may store product information, node data, room lists, room function lists, associations of nodes and rooms, and so forth. The network device 134 may be placed at any suitable point in the network architecture, including proximate to the structure associated with the ad hoc network 100 or at a location generally remote from the ad hoc network 100 (i.e., in a cloud-based arrangement). In some embodiments, the database 136 may be located at the bridge node A. In some embodiments, the bridge node A may communicate directly with the database 136 utilizing database communications 138 to send information to the database 136 as well as retrieve information associated with the ad hoc network 100, as described above with regard to FIG. 6, for example. In other embodiments, the database 136 can be accessed via communications through the communications network 122. Some implementations may utilize a plurality of databases, such as a first database local to the structure for storing a room list and a second database in a cloud-based arrangement for storing product information.

Information stored in the database 136, or other databases associated with the system, may be used to any suitable purpose, such as for analytics. For example, the information can be used to provide consumer-related information related to product consumption, product use, and other types of consumer habits.

A user may interact with the computing device 124 to control or otherwise receive information regarding various nodes in the ad hoc network 100. While the type of control will vary based on the type of nodes and the type of consumer products associated with the nodes, example types of controls include operating lighting products, operating security systems, operating appliances, operating heating/air conditioning systems, and so forth. A user may also receive product information, such as via a messaging application, regarding the status of a consumable product associated with the ad hoc network 100, or other types of information. In some embodiments, room lists, room function lists, nodes associated with the rooms, product lists, and other information stored within databases associated with the ad hoc network 100 may be accessible via the computing device 124.

In some embodiments, instructions for an enrollment process may be presented on the computing device 124. The computing device 124 may be in communication with the ad hoc network 100 through a public network (i.e., FIG. 11) or may be in communication with a network local to a bridge node of the ad hoc network (i.e., FIG. 12). In any event, the instructions may be presented via a web browser or a specialized application that is executing on the computing device 124. In one example enrollment process, the user is instructed to turn on certain lighting products within a structure. Once the lighting products has been illuminated, it can be determined which nodes are in line of sight communication with that lighting product, based on data gathered from sensors at the respective nodes. In some embodiments, when the lighting products are illuminated, they are instructed to pulse at a certain frequency that is not perceptible by the human eye, as described below with regard to FIG. 14. In some cases, the user may operate a wall switch to illuminate a plurality of lighting products simultaneously.

The user may iteratively turn on and off lighting products, as instructed by the computing device 124. In some embodiments, the user can turn on two lighting products within a certain time frame (i.e., 5 seconds) to establish a grouping of those lighting products. For example, during the enrollment process, the user may turn on two floor lamps and a table lamp in a living room within a certain time frame. The system will understand those three lighting products (i.e., nodes) are all related and can be controlled simultaneously for living room lighting. In some embodiments, the lighting products, or other types of device, may transmit an identifier (such as a SKU number), so that a circuit, or other grouping, of nodes can be established. Throughout the enrollment process, the bridge node A, or other network device, may gather information from the nodes within the ad hoc network 100 and/or from the user. For example, the user may input through an interface on the computing device 124 a functionality of a particular room in the structure 130. In some embodiments, a list of determined room functions based on node data is provided to the user through the computing device 124 and the user confirms or edits the room functions. Once the enrollment process is complete, the user may interact with the computing device 124 to control or receive data from nodes within the ad hoc network 100. In some embodiments, the enrollment process may be automated, with little or no input required from the user, as described below with regard to FIG. 14.

Zero Configuration Networking

Figure 14:
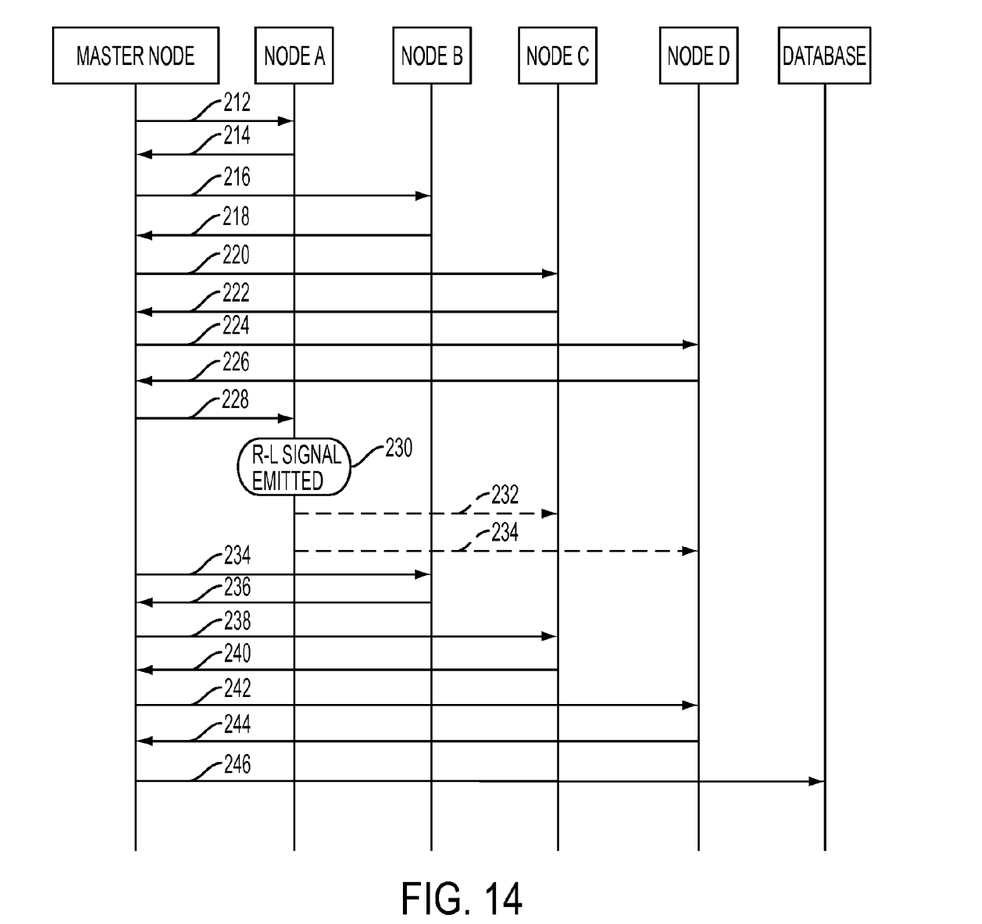
FIG. 14 shows an example message sequence chart for forming a zero configuration ad hoc network comprising a plurality of nodes capable of dual-channel communications.

FIG. 14 shows an example message sequence chart for forming a zero configuration ad hoc network comprising a plurality of nodes capable of dual-channel communications. The ad hoc network comprises a master node, node A, node B, node C, node D, and a database. As is to be readily appreciated, however, an ad hoc network in accordance with the present disclosure may have a relatively high number of node, which each may join and leave the network. Each of nodes A-D in FIG. 14 comprises a communication module, which may be similar to the communication module 14 of FIG. 2, to provide room-limited communications and room-transparent communications. While nodes A-E of the ad hoc network in FIG. 14 each have room-limited and room-transparent communication functionality, other ad hoc networks may include nodes without both forms of communication functionality. For example, some nodes may only be able to detect room-limited communications but not transmit them. Some nodes may only be able to transmit and receive room-transparent communications.

For the purposes of illustration, each of the nodes A-D are associated with a respective lighting product. As is to be readily appreciated, however, various nodes may be associated with a wide range of other types of products and devices, such as kitchen appliances, cleaning products, product dispensers, consumer products, computing devices, people, pets, wall outlets, light switches, and so forth.

During an example zero configuration process, the master node first instructs each node to acquire a sample of the lighting level proximate to the node. This instruction can take any suitable form, including a room-transparent communication message simulcasted to all the nodes A-D in the network or the instruction may be a targeted communication addressed to particular nodes. In the illustrated embodiment, instructions 212, 216, 220, 224 are sent by the master node to node A, node B, node C, and node D, respectively. While a master node is illustrated in FIG. 14, the instructions may be sent by any suitable network element. In response to receiving the instruction, each node measures a lighting level using a sensor (such as a photodiode) that is associated with the node. In some embodiments, once the measurements have been taken, nodes A-E transmit the lighting level data to the master node in room-transparent communications 214, 218, 222, 226, respectively, for storage in a database. In some embodiments, the measured lighting levels at each node are stored locally at the node for use in subsequent processing by the node.

Once background lighting levels at each node have been measured, a command 228 is sent by the master node to a subset of the entire network of nodes. In the illustrated embodiment, the command 228 is sent to a single node (node A). The command 228 instructs the node A to transmit a room-limited communication signal 230. The room-limited communication signal 230 may be any suitable type of signal, such as optical, audio, and so forth. In this embodiment, as node A is associated with a lighting product, the lighting product can be flashed on and off at a particular frequency for a particular duration to generate a modulated light source. The room-limited communication signal 230 may be imperceptible to the human eye. In one embodiment, the lighting source associated with the node A is modulated at about 1.8 kHz to generate the room-limited signal so that the modulation frequency aligns with the center frequency of a band-pass filter on the receivers, although other frequencies may be used. Other embodiments may use different frequencies. In some embodiments, the frequency is in the range of about 600 Hz to about 2000 Hz. During the emission of the room-limited communication signal by node A, room-limited signals 232, 234 are received by node C and node D. In other words, nodes C and D are in light of sight communication with node A. In the illustrated example, node B does not receive a room-limited signal from node A, which could be based on the presence of a physical obstacle (such as a wall, floor, or door, for example) blocking the line of sight path between node A and node B.

Once the master node has instructed node A to transmit a room-limited communication, the master node instructs each node to acquire a second sample of the lighting level proximate to the node. In the illustrated embodiment, instructions 234, 238, 242 are sent by the master node to the node B, the node C, and the node D, respectively. In response to receiving the instruction, each node may measure a lighting level using a sensor. The nodes B-D may utilize filtering circuitry so that only certain frequencies (such around as 1.8 kHz) are measured. In some embodiments, once the measurements have been taken, nodes B-D transmit this lighting level data to the master node in room-transparent communications 236, 240, 244, respectively. In such embodiments, the master node, or other network entity, can compare the initial measurements received via room-transparent communications 218, 222, 226 to determine if the respective node received the room-limited communication. In this case, the measurements received from node C and D would indicate successful receipt of the room-limited communication from node A. In embodiments in which the measured levels are stored at the node, each node may individually determine if it received the room-limited communication and then supply that information to the master node for subsequent processing.

The general messaging of FIG. 14 may be repeated for each node in the ad hoc network, such that each node is serially instructed to emit a room-limited communication so that nodes that receiving the communication can be identified and logged. The nodes may also provide data to the master node which can be used to determine room function. After cycling through each node in the ad hoc network, or at any other suitable time in the zero configuration process, the master node can communicate with a database via a communication 246 to provide relevant information regarding the ad hoc network, such as grouping of nodes, SKU numbers, product information, room functions, and so forth.

Once the room list and node segmentation has been determined, it can be consulted when a new node appears in the network. By way of example, it may be determined that nodes A, C and D are in a bathroom of a structure. A user may place a new node in the bathroom. The new node may transmit a room-transparent communication to the master node to inform the master node of its presence in the network. The master node may instruct it to emit a room-limited communication. In this case, nodes A, C and D would detect the room-limited communication. Based on this detection of the room-limited communication, the master node, or other entity, would determine that the new node is physically located in the same room as nodes A, C, and D and could update the room list and node segmentation accordingly.

The above embodiments provide a convenient, simple and easy to use way for a user to establish a network of nodes of products in an environment, such as consumer products in an environment. The network gathers information for the user, or may act more autonomously. The end result is a network of devices that may assist the user in maintaining and enjoying the environment.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for enrolling nodes into an ad hoc network associated with a multi-roomed structure, each node comprising a communication module configured to communicate with the ad hoc network using at least one of room-limited communications and room-transparent communications, the method comprising:
   transmitting by a first node in the ad hoc network a first room-limited communication;
   determining at a second node in the ad hoc network whether the first room-limited communication was received;
   when the first room-limited communication was received, segmenting the first and second nodes into a single room in a room list stored in memory; and
   receiving stock keeping unit (SKU) numbers from at least one of the first and second nodes in the ad hoc network.

2. The method of claim 1, comprising:
   measuring at the second node in the ad hoc network an ambient condition.

3. The method of claim 2, wherein the measuring the ambient condition is initiated by a room-transparent communication received by the second node, wherein the measured ambient condition is an ambient lighting level.

4. The method of claim 1, wherein the first room-limited communication is an acoustic signal.

5. The method of claim 1, wherein the first room-limited communication is an optical signal.

6. The method of claim 1, wherein the first room-limited communication is imperceptible to a human.

7. The method of claim 1, wherein the second node comprises a sensor, and wherein a signal generated by the sensor is represents an ambient lighting level at the first node.

8. The method of claim 1, wherein the first node comprises a lighting product and wherein transmitting the first room-limited communication comprises modulating the output of the lighting product at a frequency.

9. The method of claim 8, wherein determining whether the first room-limited communication was received at the second node comprises detecting by a sensor at the first node the output of the lighting product at the frequency.

10. The method of claim 1, comprising:
    transmitting by a third node in the ad hoc network a second room-limited communication;
    determining at the first node in the ad hoc network whether the second room-limited communication was received; and
    when the second room-limited communication was received at the first node, segmenting the third node into a room list in which the first node is segmented.

11. The method of claim 10, comprising:
    determining at the second node in the ad hoc network whether the second room-limited communication was received; and
    when the second room-limited communication was received at the second node, segmenting the third node into a room list in which the second node is segmented.

12. The method of claim 1, wherein the ad hoc network comprises a bridge node in communication with the first and second nodes, wherein the bridge node is in communication with an external communications network.

13. The method of claim 1, comprising:
    transmitting node data from the first node to the bridge node using room-transparent communications.

14. The method of claim 13, wherein the node data comprises at least one of SKU number, a network address, a bar code, and a presumed identity.

15. The method of claim 1, comprising:
receiving SKU numbers from each of a plurality of nodes in the ad hoc network; and
defining at least one circuit based on the received SKU numbers.

16. The method of claim 1, wherein the first and second nodes are in communication via room-transparent communication signals.

17. A method for enrolling nodes into an ad hoc network associated with a multi-roomed structure, each node comprising a communication module configured to communicate with the ad hoc network using at least one of room-limited communications and room-transparent communications, the method comprising:
transmitting by a first node in the ad hoc network a first room-limited communication;
determining at a second node in the ad hoc network whether the first room-limited communication was received;
when the first room-limited communication was received, segmenting the first and second nodes into a single room in a room list stored in memory;
receiving stock keeping unit (SKU) numbers from at least two of the nodes in the ad hoc network; and
defining at least one circuit based on the received SKU numbers.

18. The method of claim 17, wherein the SKU numbers are received via room-transparent communications.

19. A method for enrolling nodes into an ad hoc network associated with a multi-roomed structure, each node comprising a communication module, the method comprising:
instructing, through wireless communications, a first node in the ad hoc network to transmit a room-limited communication;
receiving from a second node an indication of whether the first room-limited communication was received by the second node; and
when the first room-limited communication was received by the second node, segmenting the first and second nodes into a single room in a room list stored in memory.

20. The method of claim 19, comprising:
instructing, through wireless communications, the second node in the ad hoc network to measure an ambient lighting level.

21. The method of claim 20, wherein the wireless communications are room-transparent communications.

22. The method of claim 20, wherein the transmitted room-limited communication is an optical communication.

23. The method of claim 22, wherein the optical communication is generated by a lighting product at the first second node.

24. The method of claim 22, wherein the optical communication is imperceptible to a human eye.

25. The method of claim 19, wherein the wireless communications comprises room-limited communication, wherein the method comprises:
determining the state of a physical object based on the room-limited communications.

26. The method of claim 25, wherein the physical object is a door positioned between the first node and the second node, and the state is one of an open state and a closed state.

27. The method of claim 25, wherein the physical object is a mobile node.

28. A system, comprising:
an ad hoc network comprising a plurality of nodes, the plurality of nodes comprising a bridge node, a first node and a second node, wherein each of the first and second node each comprise a communication module configured to communicate using at least one of a room-limited communications and room-transparent communications, wherein the bridge node comprising a controller and memory, wherein the controller is configured to:
instruct, through wireless communications, the first node in the ad hoc network to measure an ambient lighting level;
instruct, through wireless communications, the second node in the ad hoc network to transmit a room-limited communication;
receive from the first node an indication of whether the first room-limited communication was received by the first node; and
when the first room-limited communication was received by the first node, segment the first and second nodes into a single room in a room list stored in the memory.

* * * * *